(12) United States Patent
Matsumoto

(10) Patent No.: US 11,680,603 B2
(45) Date of Patent: Jun. 20, 2023

(54) BEARING, COUPLING MECHANISM FOR USE THEREIN, AND PRELOAD APPLICATION METHOD FOR USE IN COUPLING MECHANISM

(71) Applicant: DAIDO METAL COMPANY LTD., Nagoya (JP)

(72) Inventor: Toshiro Matsumoto, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 28 days.

(21) Appl. No.: 17/379,169

(22) Filed: Jul. 19, 2021

(65) Prior Publication Data

US 2022/0018388 A1    Jan. 20, 2022

(30) Foreign Application Priority Data

Jul. 20, 2020   (JP) .............................. JP2020-124066

(51) Int. Cl.
*F16C 17/03*    (2006.01)
*F16C 17/06*    (2006.01)

(52) U.S. Cl.
CPC .............. *F16C 17/03* (2013.01); *F16C 17/06* (2013.01)

(58) Field of Classification Search
CPC .......... F16C 17/03; F16C 17/06; F16C 23/04; F16C 25/04; F16C 27/02; F16C 33/08
See application file for complete search history.

(56) References Cited

U.S. PATENT DOCUMENTS

| | | | | |
|---|---|---|---|---|
| 5,634,725 | A * | 6/1997 | Chester | F16C 33/08 384/309 |
| 6,485,182 | B2 * | 11/2002 | Nicholas | F16C 17/06 384/317 |
| 10,415,635 | B2 * | 9/2019 | Arihara | F16C 37/00 |
| 2021/0131493 | A1 | 5/2021 | Frydendal et al. | |

FOREIGN PATENT DOCUMENTS

DE    102018114134 A1    12/2019
WO    2018166663 A1    9/2018

* cited by examiner

*Primary Examiner* — James Pilkington
(74) *Attorney, Agent, or Firm* — Snyder, Clark, Lesch & Chung, LLP

(57) ABSTRACT

Proposed is a novel coupling mechanism capable of applying a preload to a ball portion and a socket portion which constitute a coupling mechanism of a titling pad bearing, without using a spring element.

19 Claims, 11 Drawing Sheets

BEARING, COUPLING MECHANISM FOR USE THEREIN, AND PRELOAD APPLICATION METHOD FOR USE IN COUPLING MECHANISM

BACKGROUND OF THE INVENTION

(1) Field of the Invention

The present invention relates to improvement of a bearing, a coupling mechanism for use therein, and a preload application method for use in the coupling mechanism.

(2) Description of Related Art

A bearing has a pad, and the pad is provided with a sliding surface. A member to be slid slides in a state where it is supported by the sliding surface of the pad.

A strong force may be applied to the member to be slid in a direction other than a sliding direction, on the sliding surface, of the pad. For example, a strong force may be discontinuously applied to a turbine shaft (member to be slid) for wind power generation in a direction intersecting the shaft during a typhoon.

Therefore, making the pad itself tiltable to absorb the forces in the directions other than the sliding direction has been studied. This prevents mechanical damage to the bearing and improves durability thereof. Such a tiltable pad is called a tilting pad, and a bearing applied to the tilting pad is called a tilting pad bearing (which may be simply referred to as "bearing" herein).

In a tilting pad bearing disclosed in WO 2018/166663 A, a coupling mechanism that allows tilting of a pad to a support is provided between the pad and the support. The coupling mechanism includes a ball portion and a socket portion that slide with each other, and the pad is tilted by sliding the ball portion and the socket portion. A preload is applied between the ball portion and the socket portion in a direction in which the ball portion and the socket portion are brought closer to each other. This is to reduce a pressure amplitude of the sliding surface due to a variable load, thereby suppressing wear thereof.

SUMMARY OF THE INVENTION

In the coupling mechanism proposed in WO 2018/166663A, the pad can be titled by sliding the ball portion and the socket portion. As a result, the above-described external force applied to the member to be slid is absorbed.

In such a coupling mechanism, the preload is applied to the ball portion and the socket portion by a spring element. In this case, an elastic force of the spring element may change with the lapse of time. In addition, when the spring element exists, there is a possibility that an optimum state of the bearing cannot be maintained because a moment is generated due to a tilting angle even when the pad tilts. In other words, when the pad tilts, the elastic force of the spring element acts as a resistance, which can resist the tilting of the pad.

Therefore, an object of the present invention is to propose a novel coupling mechanism capable of applying a preload to the ball portion and the socket portion without using a spring element.

The coupling mechanism of the present invention does not hinder the application of a spring element.

The present inventor has diligently studied to solve the above problem.

Therefore, the present inventor has found that a second ball portion and a second socket portion are used as mechanical elements providing the function of such a spring element.

In order to interlock a set (first movable portion) of a first ball portion and a first socket portion and a set (second movable portion) of a second ball portion and a second socket portion, which are provided in a coupling mechanism, it is necessary to make a center of curvature of a sliding spherical surface (first sliding spherical surface) between the first ball portion and the first socket portion coincide with a center of curvature of a sliding spherical surface (second sliding spherical surface) between the second ball portion and the second socket portion.

Thus, a first aspect of the present invention is defined as follows. A coupling mechanism for a tilting pad bearing, which couples a pad and a support in such a manner that the pad can be tilted with respect to the support, and includes a first ball portion and a first socket portion to which a preload is applied, a contact surface between the first ball portion and the first socket portion serving as a first sliding spherical surface, the coupling mechanism further including a second ball portion and a second socket portion that come into contact with each other on a contact surface serving as a second sliding spherical surface, wherein a center of curvature of the first sliding spherical surface coincides with a center of curvature of the second sliding spherical surface.

In the conventional coupling mechanism including the spring element, the spring element applies a preload to the ball portion (first ball portion) and the socket portion (first socket portion) accordingly. And the mechanism inherently includes a free space in which the spring element exists. In other words, a region where the spring element exists in the coupling mechanism is also a movable region that allows sliding of the first ball portion and the first socket portion.

Here, the second ball portion and the second socket portion as alternative means to the spring element will be reviewed. For example, when the second ball portion is coupled to the first socket portion, the second socket portion is coupled to the first ball portion, and the second ball portion and the second socket portion are biased so as to be brought closer to each other, so that the first ball portion and the first socket portion are biased so as to be brought closer to each other, a preload is applied to the first ball portion and the first socket portion. Since the second ball portion and the second socket portion slide, a movable region in the coupling mechanism can also be secured.

Therefore, a second aspect of the present invention is defined as follows. A coupling mechanism for a tilting pad bearing, which couples a pad and a support in such a manner that the pad can be tilted with respect to the support, and includes a first ball portion and a first socket portion to which a preload is applied, the first ball portion and the first socket portion being in contact with each other on a first sliding spherical surface, the coupling mechanism further including a second ball portion and a second socket portion that are in contact with each other on a second sliding spherical surface, wherein the second ball portion and the first socket portion are rigidly coupled to each other, the second socket portion and the first ball portion are rigidly coupled to each other, and the second ball portion and the second socket portion are brought close to each other, so that the first ball portion and the first socket portion are preloaded so as to be brought close to each other.

In the coupling mechanism defined in another aspect defined as above, a preload can be applied to the first ball portion and the first socket portion by the second ball portion and the second socket portion. Furthermore, the second ball portion and the second socket portion can change (displace) their mutual positions while sliding, and thus constitute a movable region of the coupling mechanism, which allows sliding of the first ball portion and the first socket portion when the pad tilts.

Here, "rigid" refers to an aspect in which a pair of elements are fixed and coupled to each other without being displaced.

Here, if the movable portions are only the first ball portion and the first socket portion in the coupling mechanism, a preload cannot be applied between the first ball portion and the first socket portion. In order to apply a preload to the first ball portion and the first socket portion, it is necessary to provide a coupling portion that connect a pad (or support) to which the first ball portion is coupled and a support (or pad) to which the first socket portion is coupled, and also necessary to apply to the first ball element and the first socket portion a force for bringing them close to each other, by the coupling portion. Therefore, in order to allow tilting of the pad, a movable region is required in at least a part of the coupling portion.

In the present invention, the second ball portion and the second socket portion serve as such a movable region. In order to ensure the movability of the second ball portion and the second socket portion, sliding of the second ball portion and the second socket portion is not restricted in the coupling mechanism. For example, a space portion, which is open on a side of the center of curvature, can be formed in the second ball portion. The space portion extends outward from a virtual spherical surface on which the sliding surface (second sliding spherical surface) of the second ball portion exists. As a result, even if the second ball portion comes off the second socket portion when the pad tilts, the sliding surface of the second ball portion would not interfere with other elements. The space would be unnecessary if the entire sliding surface of the second ball portion is in contact with the second socket portion, even when the pad tilts.

Therefore, still another aspect of the present invention is defined as follows.

A preload application method of applying a preload to a first ball portion and a first socket portion that are in contact with each other on a first sliding spherical surface, in a coupling mechanism for a tilting pad bearing, which couples a pad and a support in such a manner that the pad can be tilted with respect to the support, and includes the first ball portion and the first socket portion, wherein the first ball portion is fixed to the pad, and the first socket portion is fixed to the support, the preload application method including:

bringing a second ball portion fixed to the support and a second socket portion fixed to the pad close to each other while bringing the second ball portion and the second socket portion into contact with each other on a second sliding spherical surface having a same center of curvature as a center of curvature of the first sliding spherical surface, thereby applying a preload to the first ball portion and the first socket portion.

According to still another aspect of the present invention defined as above, a preload is applied to the first ball and the first socket with a simple configuration while a function of tilting the pad is secured in the coupling mechanism.

Further still another aspect of the present invention is defined as follows.

A preload application method of applying a preload to a first ball portion and a first socket portion that are in contact with each other on a first sliding spherical surface, in a coupling mechanism for a tilting pad bearing, which couples a pad and a support in such a manner that the pad can be tilted with respect to the support, and includes the first ball portion and the first socket portion, wherein the first ball portion is fixed to the support, and the first socket portion is fixed to the pad, the preload application method including:

bringing a second ball portion fixed to the pad and a second socket portion fixed to the support close to each other while bringing the second ball portion and the second socket portion into contact with each other on a second sliding spherical surface having a same center of curvature as a center of curvature of the first sliding spherical surface, thereby applying a preload to the first ball portion and the first socket portion.

According to still another aspect of the present invention defined as above, a preload is applied to the first ball and the first socket with a simple configuration while a function of tilting the pad is secured in the coupling mechanism.

DETAILED DESCRIPTION OF PREFERRED EMBODIMENTS

Hereinafter, the present invention will be described in more detail based on embodiments.

Figure 1:
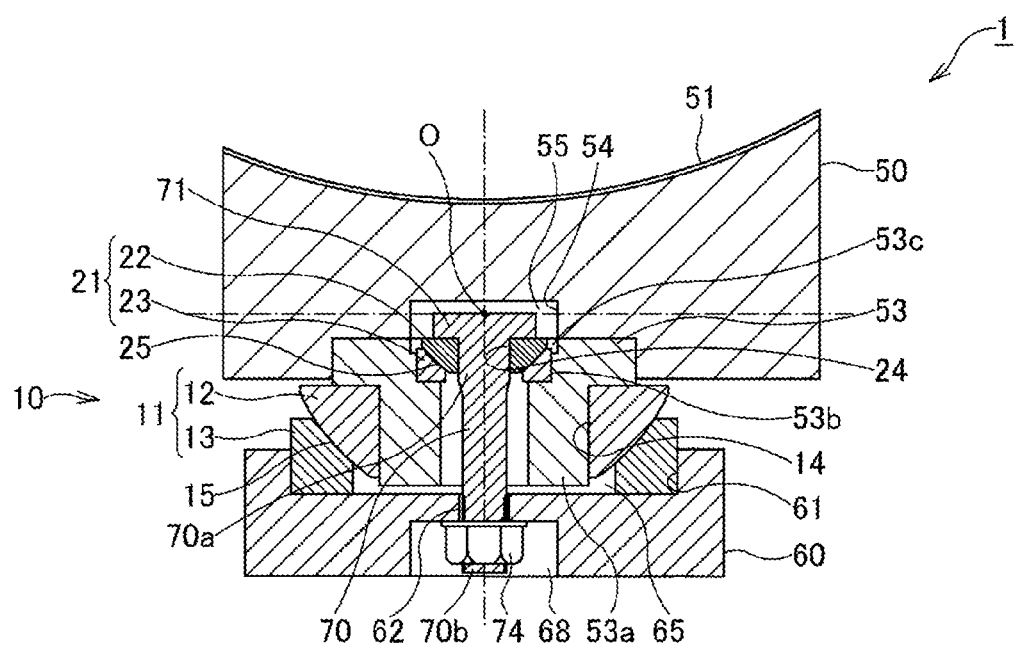
FIG. 1 is a cross-sectional view illustrating a structure of a tilting pad bearing according to an embodiment of the present invention.

FIG. 1 shows a tilting pad bearing 1 according to a first embodiment of the present invention.

The bearing 1 includes a coupling mechanism 10, a pad 50, and a support 60. For the sake of convenience, the description will proceed herein with the position of the pad 50 as an upper side and the position of the support 60 as a lower side.

The coupling mechanism 10 includes a first movable portion 11 including a first ball portion 12 and a first socket portion 13. In the first movable portion 11, the first ball portion 12 and the first socket portion 13 come into contact with each other on a first sliding spherical surface 15.

The first ball portion 12 has a shape obtained by cutting a sphere having a center O in two parallel planes, and a through hole 14 is formed at a center thereof.

A small diameter portion 53a of a protruding portion 53 is inserted into and fixed to the through hole 14. The protruding portion 53 protrudes from a lower surface of the pad 50.

The first socket portion 13 is a ring-shaped member, an inner peripheral surface (contact surface) facing the first ball portion 12 is on a virtual spherical surface, and a radius of curvature of the virtual spherical surface is equal to a radius of curvature of an outer peripheral surface (contact surface) of the first ball portion 12.

The virtual spherical surface where the outer peripheral surface (contact surface) of the first ball portion 12 and the inner peripheral surface (contact surface) of the first socket portion 13 are in contact with each other is referred to as the first sliding spherical surface 15. A center of curvature of the first sliding spherical surface 15 is indicated by a point O in FIG. 1.

The first socket portion 13 is fitted and fixed to a large-diameter concave portion 61 on an upper surface side of the support 60.

A space portion 65 is formed by the inner peripheral surface of the first socket portion 13, the bottom surface of the large-diameter concave portion 61, a lower edge of the first ball portion 12, and a lower edge of the protruding portion 53. As a result, when the first ball portion 12 tilts with respect to the first socket portion 13, the lower edges of the first ball portion 12 or the protruding portion 53 do not interfere with the bottom surface of the large-diameter concave portion 61 or an inner wall of the first socket portion 13.

In FIG. 1, an upper surface of a base end portion 71 and an upper surface of a concave portion 54 may be brought into contact with each other as spherical surfaces. Centers of curvature of the spherical surfaces are the point O.

As described above, if a second ball portion 22 and an element associated therewith (in this example, the base end portion 71) are slidable with respect to surrounding elements, the space portion 55 may not be provided.

The coupling mechanism 10 includes a second movable portion 21 including the second ball portion 22 and a second socket portion 23. In the second movable portion 21, the second ball portion 22 and the second socket portion 23 come into contact with each other on a second sliding spherical surface 25. The second ball portion 22 has a shape obtained by cutting a sphere having the center O in two parallel planes, and a through hole 24 is formed at a center thereof.

A large-diameter portion 70a on a base end side of a shaft 70 is inserted into the through hole 24. A base end portion 71 of the shaft 70 is enlarged in diameter and abuts on an upper surface of the second ball portion 22, which restricts movement of the second ball portion 22 to the upper side in the figure, and can press the second ball portion 22 toward the lower side in the figure, that is, toward the second socket portion 23.

The second socket portion 23 is a ring-shaped member, an inner peripheral surface (contact surface) facing the second ball portion 22 is on a virtual spherical surface, and a radius of curvature of the virtual spherical surface is equal to a radius of curvature of an outer peripheral surface (contact surface) of the second ball portion 22.

The virtual spherical surface where the outer peripheral surface (contact surface) of the second ball portion 22 and the inner peripheral surface (contact surface) of the second socket portion 23 are in contact with each other is referred to as the second sliding spherical surface 25. A center of curvature of the second sliding spherical surface 25 is indicated by the point O in FIG. 1.

The second socket portion 23 is inserted into and fixed to a concave portion 53b provided on an upper edge side of the protruding portion 53.

The base end portion 71 of the shaft 70 is inserted into the concave portion 54 bored in the lower surface of the pad 50. An upper edge side of the concave portion 53b of the protruding portion 53 is enlarged in diameter so as to face the concave portion 54 (enlarged-diameter concave portion 53c). The concave portion 54 and the enlarged-diameter concave portion 53c form the space portion 55. Due to the presence of the space portion 55, the base end portion 71 does not interfere with a peripheral wall of the concave portion 54.

A screw portion is formed on a tip end portion 70b side (the other end side) of the shaft 70. A tip end portion 70b is inserted into a through hole 62 bored in the center of the bottom wall of the large-diameter concave portion 61 of the support 60, and a nut 74 is threadedly engaged from the lower side. The nut 74 is tightened, whereby the base end portion 71 of the shaft 70 presses the second ball portion 22 toward the second socket portion 23. A housing concave portion 68 for housing the nut 74 is formed on a lower surface of the support 60.

The pressing force applied to the second socket portion 23 is transmitted to the first ball portion 12 to press the first ball portion 12 against the first socket portion 13. As a result, a preload between the first ball portion 12 and the first socket portion 13 is secured.

The magnitude of the preload can be adjusted by a degree of tightening of the nut 74.

When the tilting pad bearing 1 illustrated in FIG. 1 is applied to, for example, a turbine shaft for wind power generation, a plurality of (three or more) tilting pad bearings 1 are arranged at equal intervals around the turbine shaft. A force may be applied to the turbine shaft arranged in a thickness direction on the paper from all directions in a typhoon or the like.

In the bearing 1 in FIG. 1, the pad 50 tilts along an external force applied to the turbine shaft from such directions, that is, all directions. This is because the first ball portion and the first socket portion 13 constituting the first movable portion 11 are in sliding contact with each other on the spherical surface (first sliding spherical surface), so that the first ball portion 12 and the first socket portion 13 can be freely displaced about the center of curvature O.

The second socket portion 23 is rigidly coupled to the first ball portion 12 via the protruding portion 53, that is, the second socket portion 23 and the first ball portion 12 are fixed and coupled to each other without their mutual positional deviation (displacement), and the second ball portion 22 is rigidly coupled to the first socket portion 13 via the support 60 and the shaft 70. Therefore, when the first ball portion 12 and the second socket portion 23 are simultaneously displaced and the first ball portion 12 slides with respect to the first socket portion 13, the second socket portion 23 slides with respect to the second ball portion 22.

Displacement of the second ball portion 22 is not restricted by the space portion 55 at all. Similarly, displacement of first ball portion 12 is not restricted by space portion 65 at all.

In the above configuration, the preload can be adjusted by interposing a spring element between an upper surface of the housing concave portion 68 of the support 60 and the nut 74 and/or between the second ball portion 22 and the base end portion 71. As such a spring element, a disc spring, a coil spring, or a plate made of an elastic polymer material can be used.

In the above configuration, at least the contact surface-side sites of the first ball portion 12, the first socket portion 13, the second ball portion 22, and the second socket portion 23 are formed of bearing steel. SUJ2, SUJ3, and the like can be adopted as such bearing steel. Instead of bearing steel, stainless steel can also be employed.

At least one surface of these contact surfaces can be provided with a sliding layer. This sliding layer can be a surface resin layer composed of a solid lubricant and a binder resin.

Here, as the solid lubricant, one or more of graphite, h-boron nitride (h-BN), molybdenum trioxide, molybdenum disulfide, tungsten disulfide, polytetrafluoroethylene (PTFE), melamine cyanurate, carbon fluoride, phthalocyanine, graphene nanoplatelets, fullerene, ultra-high molecular weight polyethylene, NE-lauroyl-L-lysine, and the like can be selected.

As the binder resin, one or more of a polyimide resin, a polyamideimide resin, an epoxy resin, a phenol resin, a polyamide resin, a fluororesin, and an elastomer can be employed, and the binder resin may be a polymer alloy.

The surface resin layer has a film thickness of preferably 1 μm to 1 mm.

The surface resin layer may be formed by coating or by attaching a resin sheet.

Preferably, at least one of the contact surfaces of the first ball portion 12, the first socket portion 13, the second ball portion 22, and the second socket portion 23 is textured.

The textured contact surface can have a surface roughness of Rz 6.3 or less.

Figure 2:
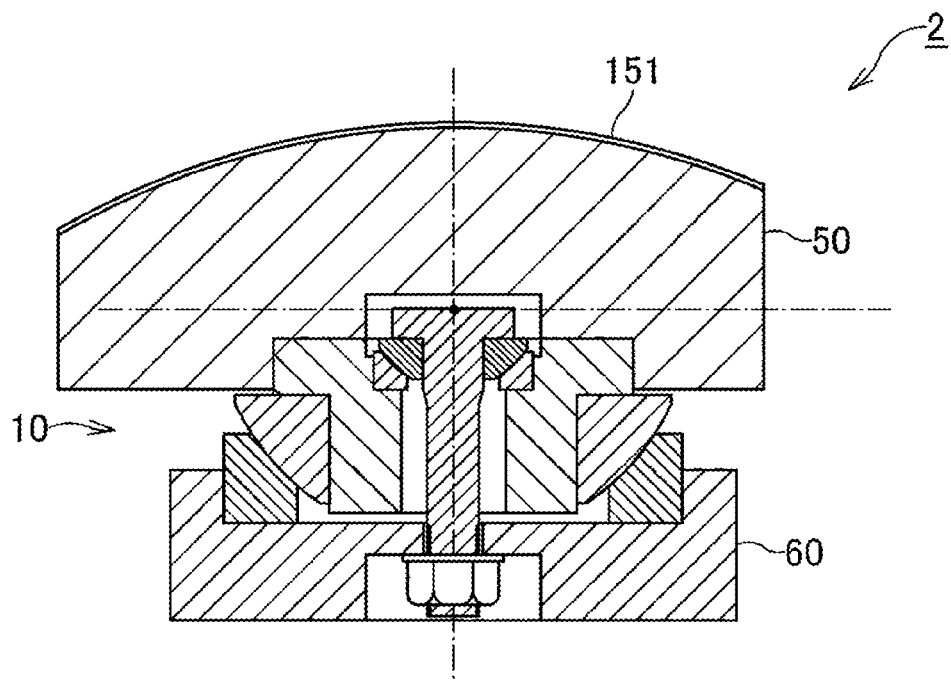
FIG. 2 is a cross-sectional view illustrating a structure of a tilting pad bearing according to another embodiment of the present invention.
Figure 3:
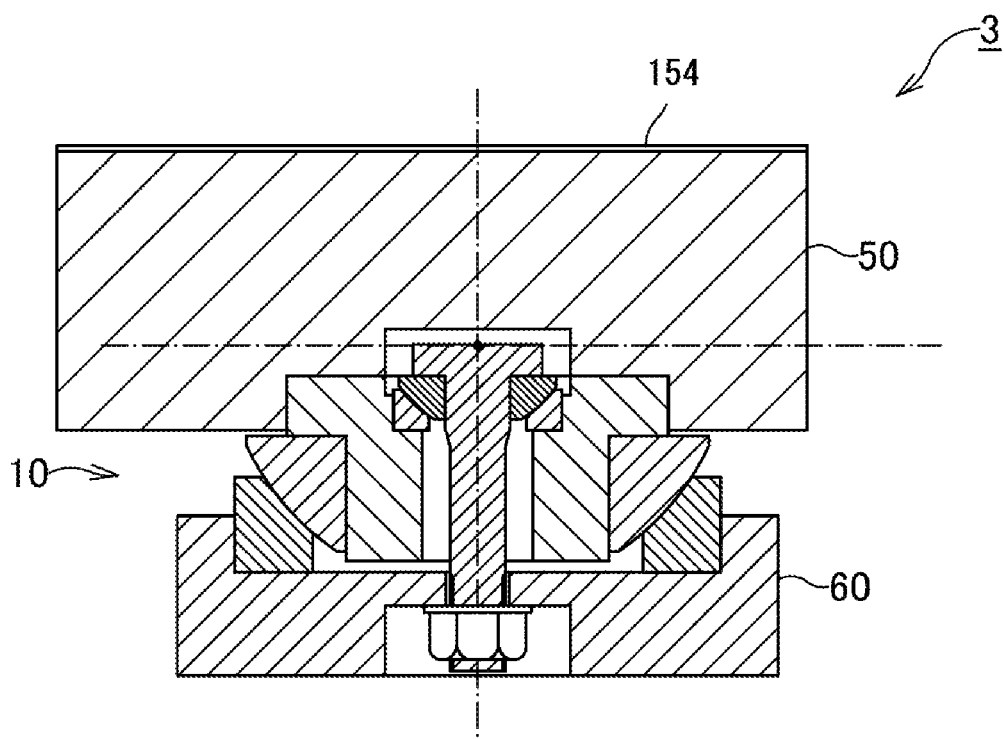
FIG. 3 is a cross-sectional view illustrating a structure of a tilting pad bearing according to another embodiment of the present invention.

The sliding surface 51 of the pad 50 is arbitrarily designed according to the member to be slid. FIG. 2 illustrates a bearing 2 in which a sliding surface 151 has a convex shape. FIG. 3 illustrates a bearing 3 in which a sliding surface 154 has a flat plate shape.

In FIGS. 2 and 3, the same elements as those in FIG. 1 are denoted by the same reference numerals, and the description thereof will be omitted.

The material of the sliding surface of the pad 50 is arbitrarily designed according to use conditions and the like required of the pad 50. For example, at least one of a PEEK composite material, a PTFE, composite material, a white metal, an aluminum alloy, and a copper alloy can be used as the sliding material. The sliding surface of the pad may have a texture structure. Preferably, the pad sliding surface has a surface roughness of Rz 6.3 or less.

A center of gravity (as viewed from the sliding surface direction) of the pad 50 with respect to the rotation center O of the coupling mechanism 10 is preferably displaced in a direction in which the member to be slid slides with respect to the pad 50. This is intended to improve durability.

The shaft 70 can adopt any structure as long as it functions as a coupling portion that couples the pad 50 and the support 60 while applying a force in a direction in which the pad 50 and the support 60 are brought close to each other. In other words, the coupling portion is a member that rigidly couples the first ball portion to the second socket portion and rigidly couples the first socket portion to the second ball portion.

In the example in FIG. 1, the nut 74 is threadedly engaged with and fastened to the screw portion at the tip end portion 70b of the shaft 70 to apply a preload to the first ball portion 12 and the first socket portion 13. The preload is adjusted by adjusting the degree of tightening.

Figure 4:
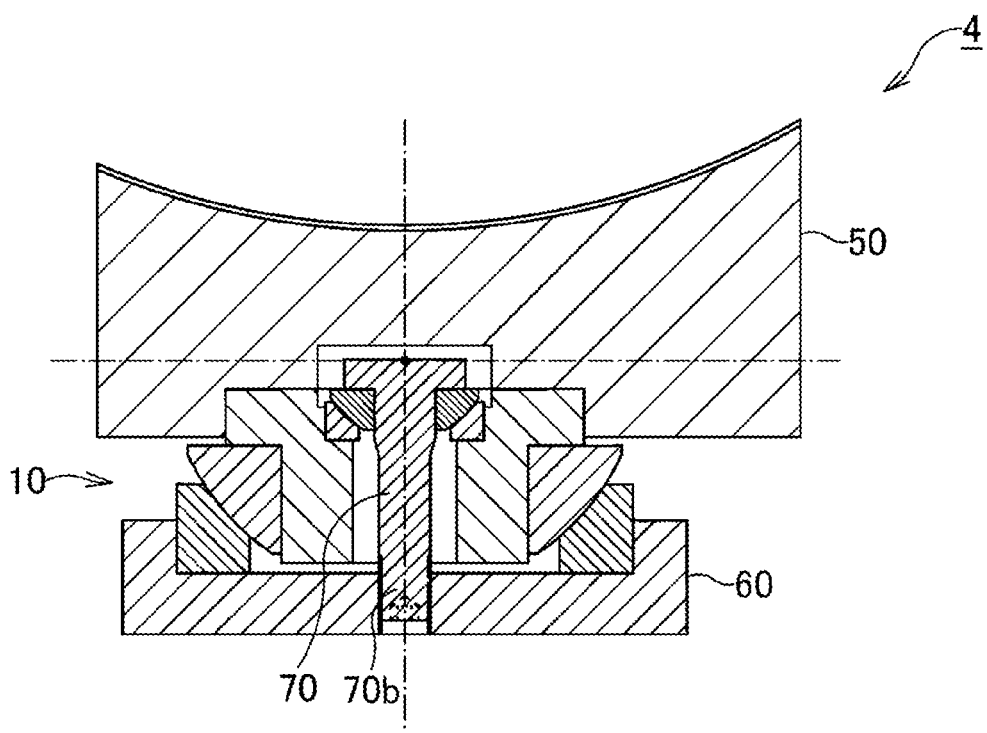
FIG. 4 is a cross-sectional view illustrating a structure of a tilting pad bearing according to another embodiment of the present invention.

In a bearing 4 in FIG. 4, the nut is omitted, and the screw portion at the tip end portion 70b of the shaft 70 is directly threadedly engaged with the support 60. The preload can be adjusted by adjusting the degree of threaded engagement (the position in an axial direction of the shaft 70). In FIG. 4, the same elements as those in FIG. 1 are denoted by the same reference numerals, and the description thereof will be omitted.

Figure 5:
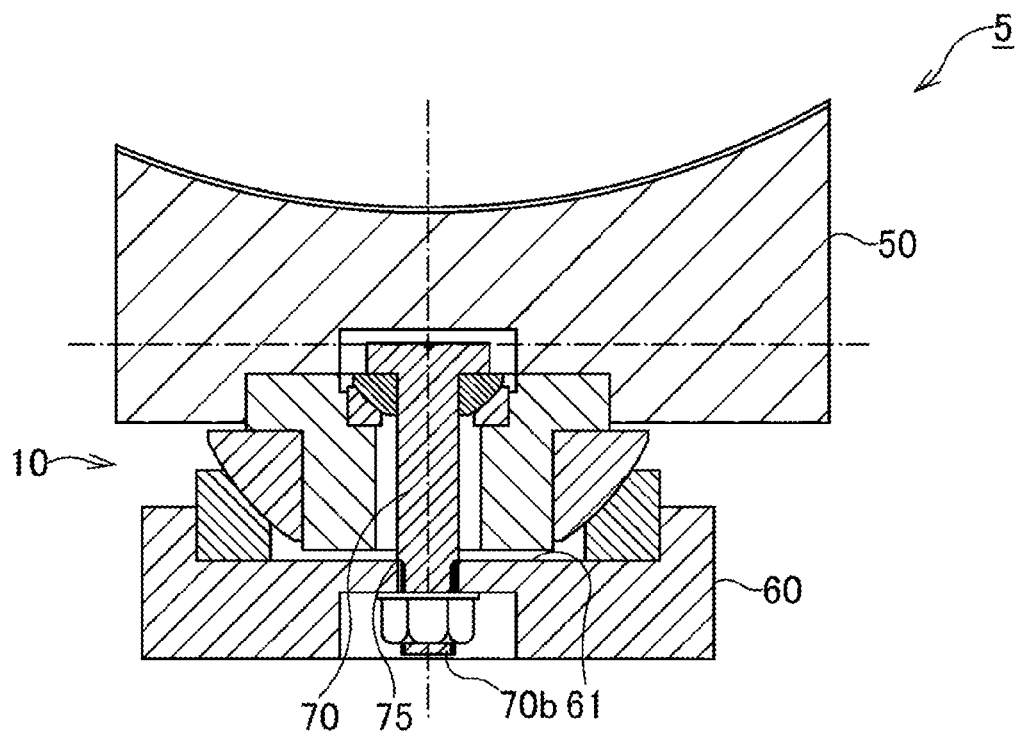
FIG. 5 is a cross-sectional view illustrating a structure of a tilting pad bearing according to another embodiment of the present invention.

In a bearing 5 in FIG. 5, a stepped portion 75 is provided at the tip end portion 70b of the shaft 70. The stepped portion 75 abuts on the bottom surface of the large-diameter concave portion 61 of the support 60. A distance from the stepped portion 75 to a lower surface of the base end portion 71 is made shorter than a distance from the bottom surface of the large-diameter concave portion 61 to the lower surface of the base end portion 71, whereby a preload is applied between the first ball portion 12 and the first socket portion 13. The two distances are adjusted, so that the preload can also be adjusted.

In FIG. 5, the same elements as those in FIG. 1 are denoted by the same reference numerals, and the description thereof will be omitted.

Figure 6:
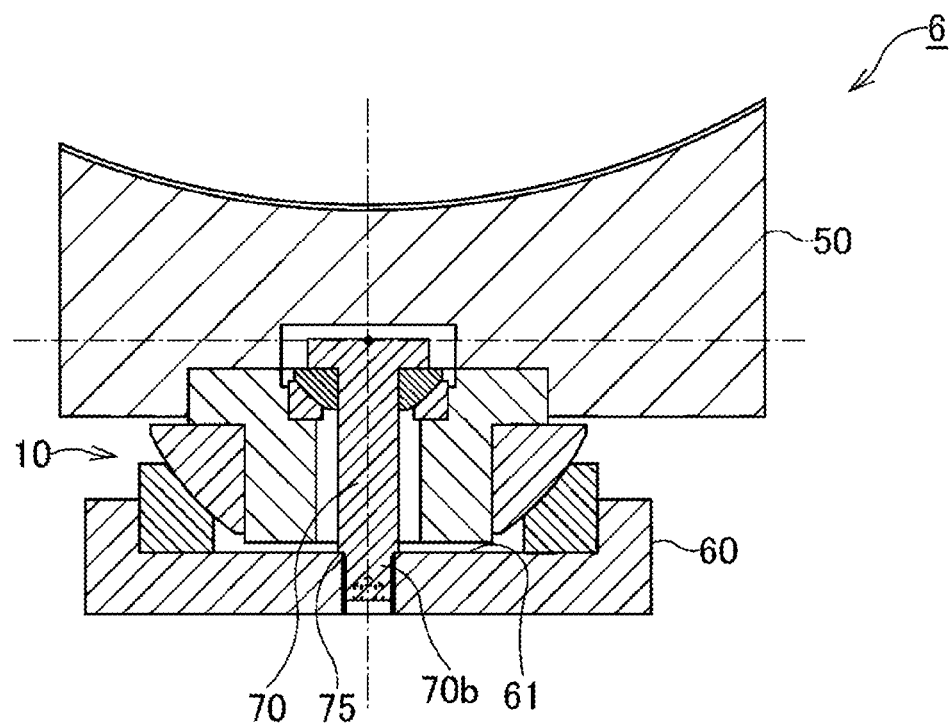
FIG. 6 is a cross-sectional view illustrating a structure of a tilting pad bearing according to another embodiment of the present invention.

Also in an example in FIG. 6, the stepped portion 75 is provided at the tip end portion 70b of the shaft 70. An action of the stepped portion 75 is the same as that in the example in FIG. 5. In FIG. 6, the same elements as those in FIG. 5 are denoted by the same reference numerals, and the description thereof will be omitted.

FIGS. 7 to 11 are schematic diagrams illustrating a positional relationship between the first sliding spherical surface 15 and the second sliding spherical surface 25.

The centers of curvature of the first sliding spherical surface 15 and the second sliding spherical surface 25 are made to coincide with each other at the point O. Here, "coincide" means that coordinates of the centers of curvature physically coincide with each other, and, additionally, a margin is allowed within a range in which the pad 50 can be tilted.

Figure 7:
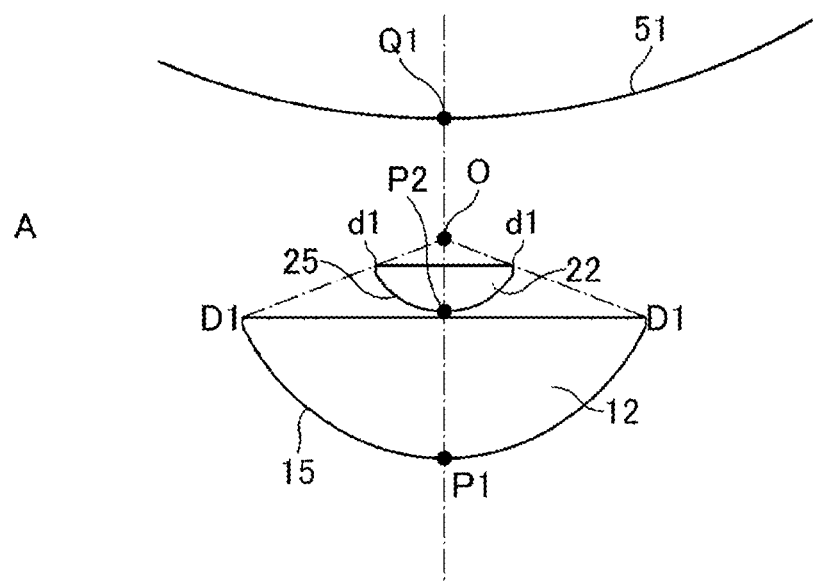
FIG. 7 is a schematic view illustrating a positional relationship between a first sliding spherical surface and a second sliding spherical surface.

FIG. 7 schematically illustrates the example in FIG. 1. In FIG. 7, reference numeral 12 schematically denotes a first ball portion, and reference numeral 22 schematically denotes a second ball portion. Their peripheral surfaces are a first sliding spherical surface 15 and a second sliding spherical surface 25, respectively.

In the example in FIG. 7, both ends d1 and d1 at an upper edge of the second ball portion 22 (both ends of the diameter drawn on a circular upper surface when the second ball portion 22 is viewed from the center of curvature O) exist on a virtual line connecting both ends D1 and D1 at an upper edge of the first ball portion 12 (both ends of the diameter drawn on a circular upper surface when the first ball portion 12 is viewed from the center of curvature O) and the center of curvature O.

The center of curvature O and a lowermost point Q1 of the sliding surface 51 of the pad 50 exist on a virtual line connecting a center P1 of the first sliding spherical surface of the first ball portion 12 and a center P2 of the second sliding spherical surface of the second ball portion.

An interior angle of a vertex of a virtual isosceles triangle formed by connecting the center of curvature O as its vertex and both the ends D1 and D1 (d1 and d1) is preferably 60 to 180 degrees. A more preferable angle is 90 to 150 degrees.

Figure 8:
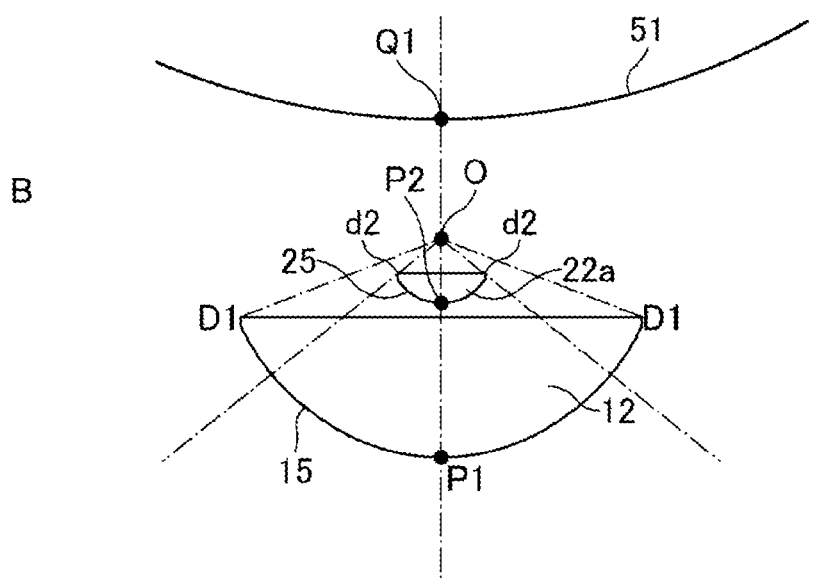
FIG. 8 is a schematic view illustrating a positional relationship between a first sliding spherical surface and a second sliding spherical surface in another aspect.

In an example illustrated in FIG. 8, a diameter of a second ball portion 22a is reduced as compared with that in the example in FIG. 7. In other words, an angle of the vertex of the virtual isosceles triangle formed by connecting the center of curvature O as its vertex and both the ends d2 and d2 of the second ball portion 22a is smaller than an angle of the vertex of the virtual isosceles triangle formed by connecting the center of curvature O as its vertex and both the ends D1 and D1 of the first ball portion 12. A vertex angle of the isosceles triangle formed of 0, d2, and d2 can be set to 60 to 150 degrees. A more preferable angle is 60 to 120 degrees.

Figure 9:
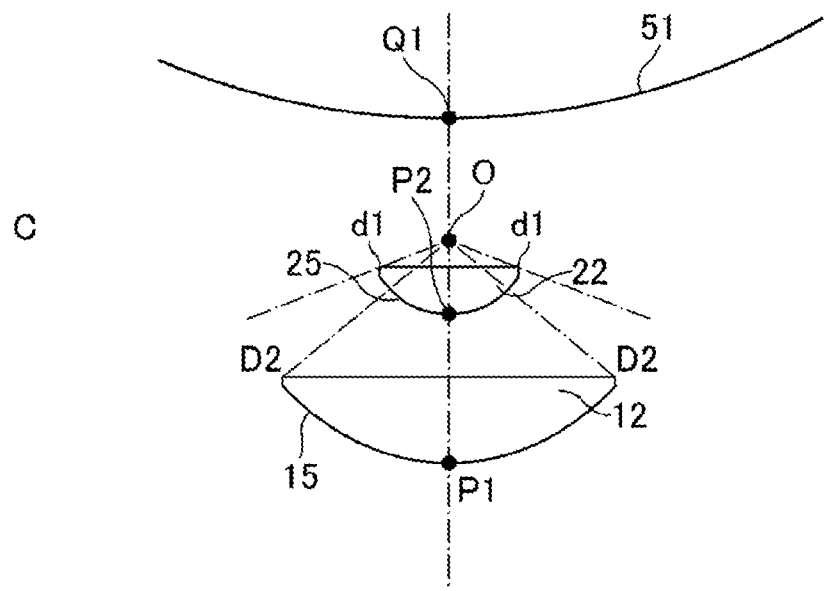
FIG. 9 is a schematic view illustrating a positional relationship between a first sliding spherical surface and a second sliding spherical surface in another aspect.

In an example in FIG. 9, the diameter of the first ball portion 12 is reduced as compared with that in the example in FIG. 7. In other words, an angle of the vertex of the virtual isosceles triangle formed by connecting the center of curvature O as its vertex and both the ends d1 and d1 of the second ball portion 22 is made larger than an angle of the vertex of the virtual isosceles triangle formed by connecting the center of curvature as its vertex and both the ends D2, D2 of the first ball portion 12.

Figure 10:
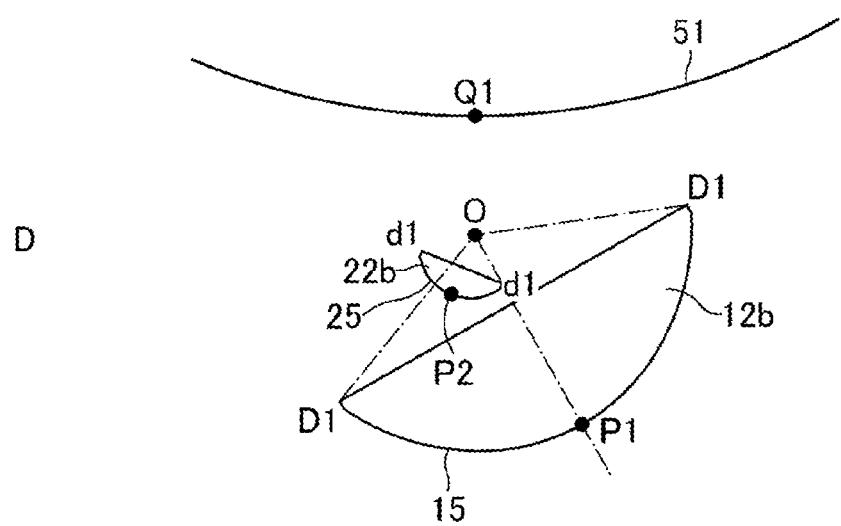
FIG. 10 is a schematic view illustrating a positional relationship between a first sliding spherical surface and a second sliding spherical surface in another aspect.

In an example illustrated in FIG. 10, as compared with the example in FIG. 7, the center P1 of the first sliding spherical surface 15 of the first ball portion 12b, the center P2 of the first sliding spherical surface 15 of the second ball portion 22b, and the center of curvature O are not on a straight line.

Figure 11:
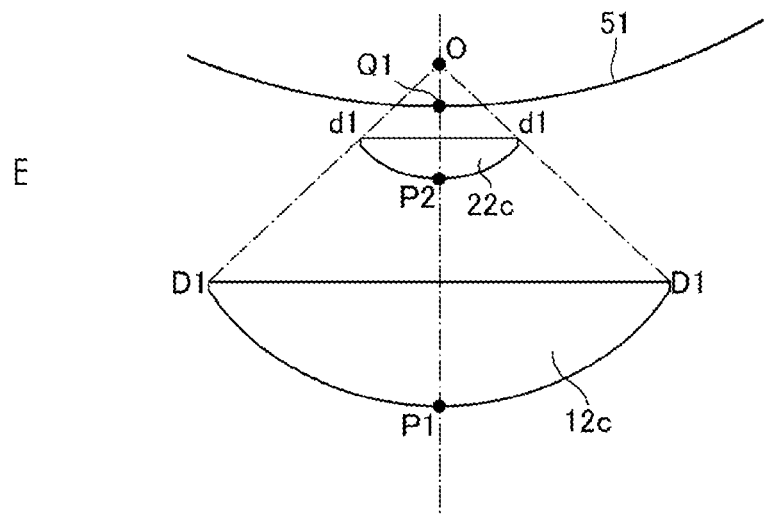
FIG. 11 is a schematic view illustrating a positional relationship between a first sliding spherical surface and a second sliding spherical surface in another aspect.

In an example in FIG. 11, as compared with the example in FIG. 7, the center of curvature O of the first sliding spherical surface 15 and the second sliding spherical surface 25 is positioned above the sliding surface 51 of the pad 50.

In FIGS. 7 to 11, there is a virtual radial line from the center of curvature O that intersects both the first ball portion and the second ball portion. By providing the shaft at the position of the radial line, the force applied to the second ball portion is directly transmitted to the first ball portion side.

A radius of curvature of the first sliding spherical surface 15 is made longer than a radius of curvature of the second sliding spherical surface 25.

In FIGS. 7 to 10, the center of curvature O exists between the outer peripheral surface of the first ball portion and the outer peripheral surface of the second ball portion, and the sliding surface 51 of the pad 50.

In FIG. 11, the sliding surface 51 of the pad 50 exists between the center of curvature O, and the outer peripheral surface of the first ball and the outer peripheral surface of the second ball portion. In other words, the center of curvature O exists on an opposite side across the sliding surface 51 of the pad 50 as viewed from the first and second sliding spherical surfaces.

Figure 12:
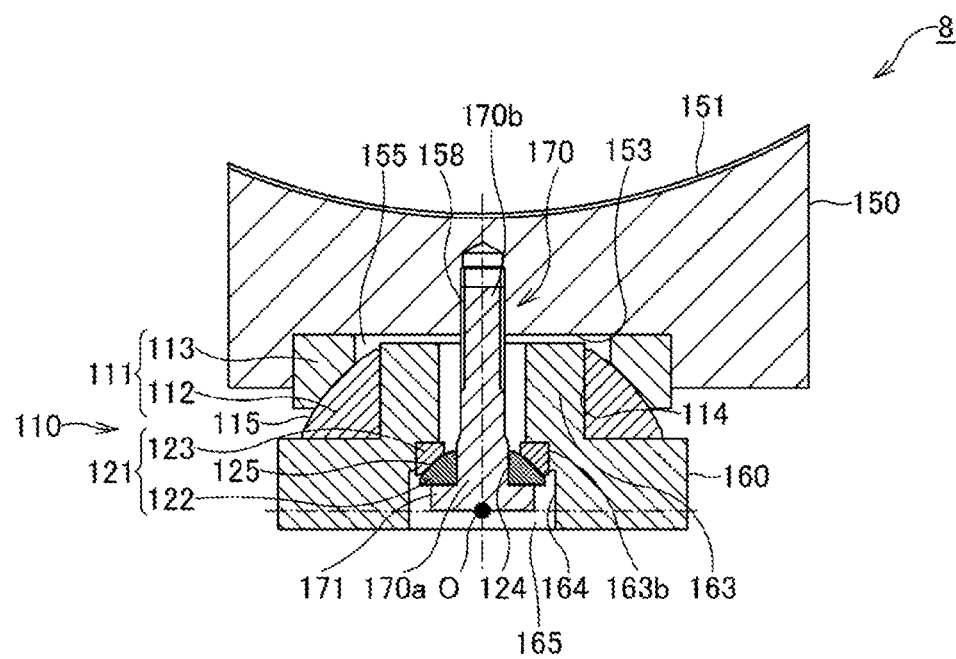
FIG. 12 is a cross-sectional view illustrating a structure of a tilting pad bearing according to another embodiment of the present invention.

FIG. 12 shows a tilting pad bearing 8 according to another embodiment.

The bearing 8 includes a coupling mechanism 110, a pad 150, and a support 160.

The coupling mechanism 110 includes a first movable portion 111 including a first ball portion 112 and a first socket portion 113. In the first movable portion 111, the first ball portion 112 and the first socket portion 113 come into contact with each other on a first sliding spherical surface 115.

The first ball portion 112 has a shape obtained by cutting a sphere having a center O in two parallel planes, and a through hole 114 is formed at a center thereof.

A protruding portion 163 protruding from the support 160 is inserted into and fixed to the through hole 114.

The first socket portion 113 is a ring-shaped member, an inner peripheral surface (contact surface) facing the first ball portion 112 is on a virtual spherical surface, and a radius of curvature of the virtual spherical surface is equal to a radius of curvature of an outer peripheral surface (contact surface) of the first ball portion 112.

The virtual spherical surface where the outer peripheral surface (contact surface) of the first ball portion 112 and the inner peripheral surface (contact surface) of the first socket portion 113 are in contact with each other is referred to as the first sliding spherical surface 115. A center of curvature of the first sliding spherical surface 115 is indicated by a point O in FIG. 12.

The first socket portion 113 is fitted and fixed to a large-diameter concave portion 153 on a lower surface side of the pad 150.

A space portion 155 is formed by an inner periphery of the first socket portion 113, an upper surface of the large-diameter concave portion 153, an upper edge of the first ball portion 112, and an upper edge of the protruding portion 163. As a result, when the first ball portion 112 tilts relative to the first socket portion 113, the upper edges of the first ball portion 112 and the protruding portion 163 do not interfere with the upper surface of the large-diameter concave portion 153 or an inner wall of the first socket portion 113.

The coupling mechanism 110 includes a second movable portion 121 including a second ball portion 122 and a second socket portion 123. In the second movable portion 121, the second ball portion 122 and the second socket portion 123 come into contact with each other on a second sliding spherical surface 125. The second ball portion 122 has a shape obtained by cutting a sphere having the center O in two parallel planes, and a through hole 124 is formed at a center thereof.

A large-diameter portion 170a on a base end side of a shaft 170 is inserted into the through hole 124. A base end portion 171 of the shaft 170 is enlarged in diameter and abuts on a lower surface (a surface on a side of the center of curvature O) of the second ball portion 122 to restrict movement to the lower side in the figure, and can press the second ball portion 122 toward the upper side in the figure, that is, toward the second socket portion 123.

The second socket portion 123 is a ring-shaped member, an inner peripheral surface (contact surface) facing the second ball portion 122 is on a virtual spherical surface, and a radius of curvature of the virtual spherical surface is equal to a radius of curvature of an outer peripheral surface (contact surface) of a second ball portion 122.

The virtual spherical surface where the outer peripheral surface (contact surface) of the second ball portion 122 and the inner peripheral surface (contact surface) of the second socket portion 123 are in contact with each other is referred to as the second sliding spherical surface 125. A center of curvature of the second sliding spherical surface 125 is indicated by a point O in FIG. 8.

The second socket portion 123 is inserted into and fixed to a concave portion 163b provided on a lower edge side of the protruding portion 163.

The base end portion 171 of the shaft 170 is inserted into a concave portion 164 bored in a lower surface of the support 160. The concave portion 164 forms a space portion 165. Due to the presence of the space portion 165, the base end portion 171 does not interfere with a peripheral wall of the concave portion 164.

A screw portion is formed on a tip end portion 170b side (the other end side) of the shaft 170. The tip end portion 170b is threadedly engaged into a screw hole 158 bored in a center of a bottom wall of the large-diameter concave portion 153 of the pad 150. A degree of screwing of the screw is adjusted, so that the pressing force to be applied from the second ball portion 122 to the second socket portion 123 is adjusted.

The pressing force applied to the second socket portion 123 is transmitted to the first ball portion 112 to press the first ball portion 112 against the first socket portion 113. As a result, a preload between the first ball portion 112 and the first socket portion 113 is secured.

The material and the like of each component constituting the bearing in FIG. 12 are the same as the material and the like of each component constituting the bearing in FIG. 1.

A stepped portion is provided on the tip end portion 170b side of the shaft 170, and a distance between the stepped portion and the base end portion 171 is adjusted, so that the preload to be applied to the first ball portion 112 and the first socket portion 113 can be adjusted.

Note that the preload can also be adjusted by interposing a spring element between the base end portion 171 and the second ball portion 122.

FIGS. 13 to 16 illustrate a relationship between the first sliding spherical surface 115 and the second sliding spherical surface 125, in accordance with FIGS. 7 to 11.

The centers of curvature of the first sliding spherical surface 115 and the second sliding spherical surface 125 are made to coincide with each other at the point O.

Figure 13:
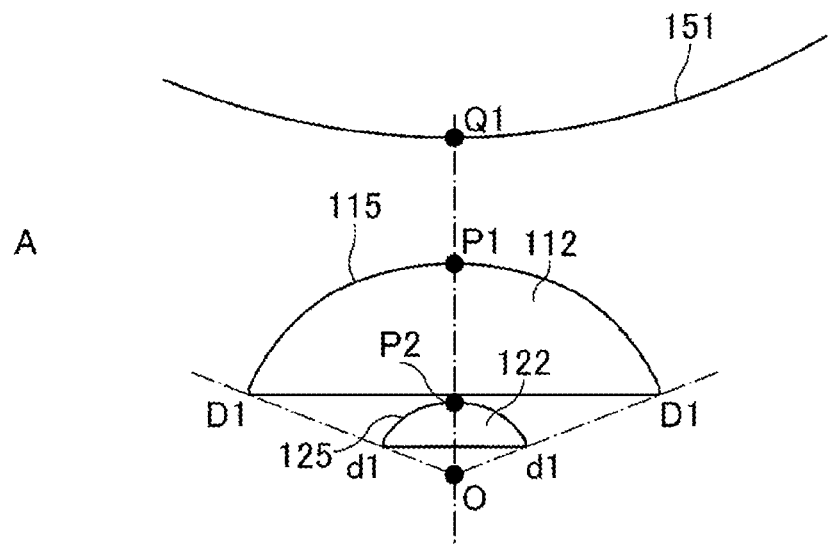
FIG. 13 is a schematic view illustrating a positional relationship between a first sliding spherical surface and a second sliding spherical surface.

FIG. 13 schematically illustrates the example in FIG. 12. In FIG. 13, reference numeral 112 schematically denotes a first ball portion, and reference numeral 122 schematically denotes a second ball portion. Their peripheral surfaces are a first sliding spherical surface 115 and a second sliding spherical surface 125, respectively.

In the example in FIG. 13, both ends d1 and d1 at an upper edge of the second ball portion 122 exist on a virtual line connecting both ends D1 and D1 at a lower edge of the first ball portion 112 and the center of curvature O.

The center of curvature O and a lowermost point Q1 of the sliding surface 151 of the pad 150 exist on a virtual line connecting a center P1 of the first ball portion 112 and a center P2 of the second ball portion 122.

An interior angle of a vertex of a virtual isosceles triangle formed by connecting the center of curvature O as its vertex and both the ends D1 and D1 (d1 and d1) is preferably 60 to 180 degrees. A more preferable angle is 90 to 150 degrees.

Figure 14:
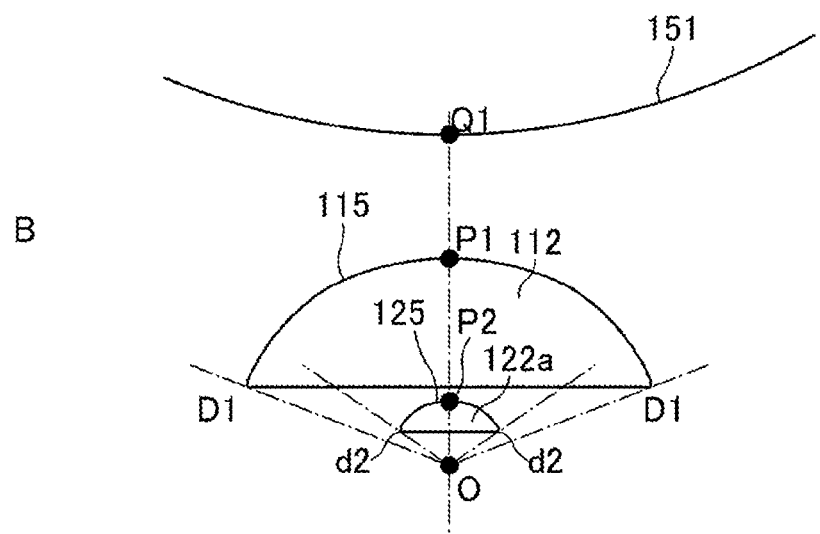
FIG. 14 is a schematic view illustrating a positional relationship between a first sliding spherical surface and a second sliding spherical surface in another aspect.

In an example illustrated in FIG. 14, a diameter of a second ball portion 122a is reduced as compared with that in the example in FIG. 13. In other words, an angle of the vertex of the virtual isosceles triangle formed by connecting the center of curvature O as its vertex and both the ends d2 and d2 of the second ball portion 122a is smaller than an angle of the vertex of the virtual isosceles triangle formed by connecting the center of curvature O as its vertex and both the ends D1 and D1 of the first ball portion 112. A vertex angle of the isosceles triangle formed of O, d2, and d2 can be set to 60 to 150 degrees. A more preferable angle is 60 to 120 degrees.

Figure 15:
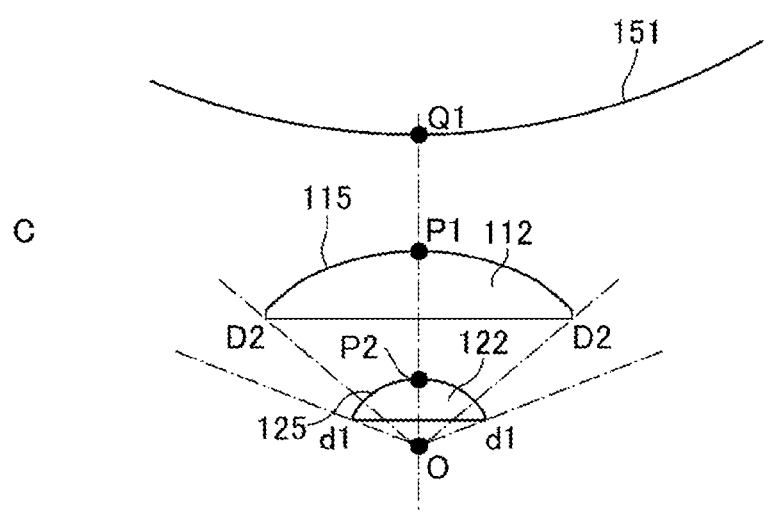
FIG. 15 is a schematic view illustrating a positional relationship between a first sliding spherical surface and a second sliding spherical surface in another aspect.

In an example illustrated in FIG. 15, a diameter of the first ball portion 112 is reduced as compared with that in the example in FIG. 13. In other words, an angle of the vertex of the virtual isosceles triangle formed by connecting the center of curvature O as its vertex and both the ends d1 and d1 of the second ball portion 122 is larger than an angle of the vertex of the virtual isosceles triangle formed by connecting the center of curvature O as its vertex and both the ends D2 and D2 of the first ball portion 112.

Figure 16:
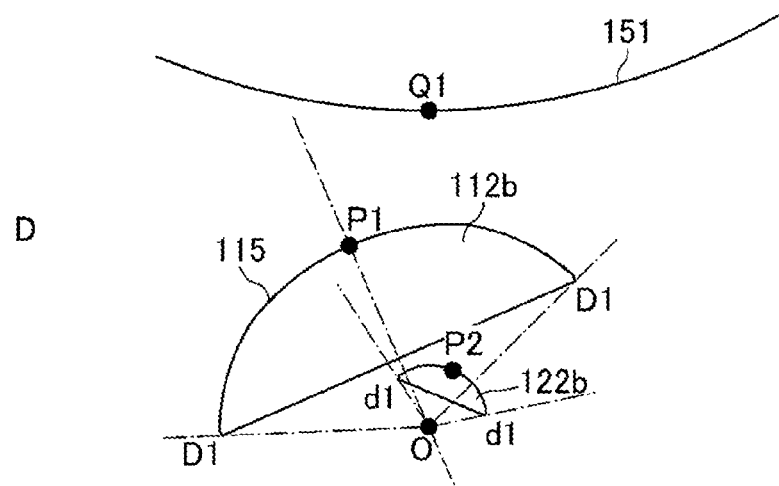
FIG. 16 is a schematic view illustrating a positional relationship between a first sliding spherical surface and a second sliding spherical surface in another aspect.

In an example illustrated in FIG. 16, a center P1 of a first ball portion 112b, a center P2 of a second ball portion 122b, and the center of curvature O are not on a straight line, as compared with the example in FIG. 13.

In FIGS. 13 to 16, there is a virtual radial line from the center of curvature O that intersects both the first ball portion and the second ball portion. By providing the shaft at the position of the radial line, the force applied to the second ball portion is directly transmitted to the first ball portion side.

A radius of curvature of the first sliding spherical surface 115 is made longer than a radius of curvature of the second sliding spherical surface 125.

The center of curvature O is farther from the sliding surface 151 of the pad 150 than from the first ball portion and the second ball portion.

The present invention is not limited to the description of the embodiments of the invention. Various modifications are also included in the present invention as long as those skilled in the art can easily conceive them without departing from the recitation of the claims. A device using a bearing mechanism, such as an internal combustion engine, using the sliding member of the present invention exhibits excellent sliding characteristics.

Hereinafter, the following matters will be disclosed.

(1) A coupling mechanism for a tilting pad bearing, which couples a pad and a support in such a manner that the pad can be tilted with respect to the support, and includes a first ball portion and a first socket portion to which a preload is applied, a contact surface between the first ball portion and the first socket portion serving as a first sliding spherical surface, the coupling mechanism further including a second ball portion and a second socket portion that come into contact with each other on a contact surface serving as a second sliding spherical surface, wherein a center of curvature of the first sliding spherical surface coincides with a center of curvature of the second sliding spherical surface.

(2) The coupling mechanism according to (1), wherein a radius of curvature of the first sliding spherical surface is longer than a radius of curvature of the second sliding spherical surface on a virtual radial line from the center of curvature, the virtual radial line intersecting both the first ball portion and the second ball portion.

(3) The coupling mechanism according to (2), wherein the center of curvature exists between the first and second sliding spherical surfaces and a sliding surface of the pad, or on an opposite side across the sliding surface as viewed from the first and second sliding spherical surfaces.

(4) The coupling mechanism according to (2), wherein the center of curvature is farther from the sliding surface of the pad than from the first and the second sliding spherical surface.

(5) The coupling mechanism according to any one of (1) to (4), wherein a center of the second sliding spherical surface exists on a virtual line connecting a center of the first sliding spherical surface and the center of curvature.

(6) The coupling mechanism according to any one of (1) to (5), wherein a first interior angle, on a side of the center of curvature, of a virtual isosceles triangle formed by the center of curvature and both ends, on a side of the center of curvature, of the first sliding spherical surface is 60 to 180 degrees.

(7) The coupling mechanism according to any one of (1) to (6), wherein a second interior angle, on a side of the center of curvature, of a virtual isosceles triangle formed by the center of curvature and both ends, on a side of the center of curvature, of the second sliding spherical surface is 60 to 150 degrees.

(8) The coupling mechanism according to (7), wherein the first interior angle≥ the second interior angle.

(9) The coupling mechanism according to (3), wherein the first ball portion is fixed to the pad, and the first socket portion is fixed to the support, and the second ball portion is fixed to the support, and the second socket portion is fixed to the pad.

(10) The coupling mechanism according to (4), wherein the first ball portion is fixed to the support, and the first socket portion is fixed to the pad, and
the second ball portion is fixed to the pad, and the second socket portion is fixed to the support.

(11) The coupling mechanism according to any one of (1) to (10), further including a shaft that couples the pad and the support, wherein the shaft applies a preload to bring the pad and the support close to each other.

(12) The coupling mechanism according to (11), wherein the shaft penetrates the first sliding spherical surface and the second sliding spherical surface.

(13) The coupling mechanism according to (3), further including a shaft that couples the pad and the support, wherein the shaft applies a preload to bring the pad and the support close to each other, the second ball portion is fixed to one end side of the shaft, and the other end side of the shaft is fixed to the support.

(14) The coupling mechanism according to (4), further including a shaft that couples the pad and the support, wherein the shaft applies a preload to bring the pad and the support close to each other, the second ball portion is fixed to one end side of the shaft, and the other end side of the shaft is fixed to the pad.

(15) The coupling mechanism according to (13) or (14), wherein the other end side of the shaft has a screw portion, and the preload is adjusted by adjusting a position of the screw portion with respect to the support or the pad.

(16) The coupling mechanism according to (13) or (14), wherein a stepped portion that abuts on the support or the pad is formed on the other end side of the shaft, and the preload is adjusted by adjusting a distance between the stepped portion and the second ball on the one end side.

(17) The coupling mechanism according to (15), wherein the screw portion on the other end side of the shaft penetrates the support, and a nut is threadedly engaged with the screw portion penetrating the support.

(18) The coupling mechanism according to (15), wherein the screw portion on the other end of the shaft is threadedly engaged with the support or the pad.

(19) The coupling mechanism according to any one of (1) to (18), wherein a first sliding layer including a first solid lubricant is formed on at least one of sliding surfaces of the first ball portion and the first socket portion, and a second sliding layer including a second solid lubricant is formed on at least one of sliding surfaces of the second ball portion and the second socket portion.

(20) The coupling mechanism according to any one of (1) to (19), wherein
a first sliding layer including a first sliding material is formed on at least one of the sliding surfaces of the first ball portion and the first socket portion, and
a second sliding layer including a second sliding material is formed on at least one of the sliding surfaces of the second ball portion and the second socket portion.

(21) The coupling mechanism according to (20), wherein the first sliding material and the second sliding material are composed of a solid lubricant and a resin binder resin.

(22) The coupling mechanism according to any one of (1) to (21), wherein
a first textured surface is formed on at least one of the sliding surfaces of the first ball portion and the first socket portion, and
a second textured surface is formed on at least one of the sliding surfaces of the second ball portion and the second socket portion.

(23) A coupling mechanism for a tilting pad bearing, which couples a pad and a support in such a manner that the pad can be tilted with respect to the support, and includes a first ball portion and a first socket portion to which a preload is applied,
the first ball portion and the first socket portion being in contact with each other on a first sliding spherical surface,
the coupling mechanism further including a second ball portion and a second socket portion that are in contact with each other on a second sliding spherical surface, wherein
a center of curvature of the first sliding spherical surface coincides with a center of curvature of the second sliding spherical surface, and
the second ball portion and the first socket portion are rigidly coupled to each other, the second socket portion and the first ball portion are rigidly coupled to each other, and the second ball portion and the second socket portion are brought close to each other, so that the first ball portion and the first socket portion are preloaded so as to be brought close to each other.

(24) The coupling mechanism according to (23), wherein upper edges, on a side of the center of curvature, of the first ball portion and the second ball portion are open.

(25) A tilting pad bearing including the coupling mechanism according to any one of (1) to (24) and a pad.

(26) The bearing according to (25), wherein a sliding surface of the pad has a concave shape, a convex shape, or a flat plate shape along a tilting direction of the pad.

(27) The bearing according to (25) or (26), wherein the sliding surface of the pad is formed with a textured surface, and/or is formed of one or more selected from a PEEK composite, a PTFE composite, a white metal, an aluminum alloy, and a copper alloy.

(28) The bearing according to any one of (25) to (27), wherein, when the pad is viewed from a sliding surface side, a center of gravity of a projection surface thereof and the center of curvature are displaced.

(29) The bearing according to (26), wherein the sliding surface of the pad has a concave shape along the tilting direction of the pad, and, when the pad is viewed from a plane, a lowermost end of the sliding surface of the pad coincides with the center of curvature.

(30) The tilting pad bearing according to any one of (26) to (29), further including a support, wherein the support is arranged so as to sandwich the coupling mechanism with the pad.

(31) A preload application method of applying a preload to a first ball portion and a first socket portion that are in contact with each other on a first sliding spherical surface, in a coupling mechanism for a tilting pad bearing, which couples a pad and a support in such a manner that the pad can be tilted with respect to the support, and includes the first ball portion and the first socket portion, wherein the first ball portion is fixed to the pad, and the first socket portion is fixed to the support, the preload application method including:
bringing a second ball portion fixed to the support and a second socket portion fixed to the pad close to each other while bringing the second ball portion and the second socket portion into contact with each other on a second sliding spherical surface having a same center of curvature as a center of curvature of the first sliding spherical surface and connecting the second ball portion and the second socket portion, thereby applying a preload to the first ball portion and the first socket portion.

(32) The preload application method according to (31), wherein a relative distance between the second ball portion and the second socket portion is adjusted by fixing the second ball portion to one end of a shaft penetrating through the first sliding spherical surface and the second sliding spherical surface and adjusting a coupling position of the other end of the shaft with respect to the support.

(33) A preload application method of applying a preload to a first ball portion and a first socket portion that are in contact with each other on a first sliding spherical surface, in a coupling mechanism for a tilting pad bearing, which couples a pad and a support in such a manner that the pad can be tilted with respect to the support, and includes the first ball portion and the first socket portion, wherein the first ball portion is fixed to the support, and the first socket portion is fixed to the pad, the preload application method including:
bringing a second ball portion fixed to the pad and a second socket portion fixed to the support close to each other while bringing the second ball portion and the second socket portion into contact with each other on a second sliding spherical surface having a same center of curvature as a center of curvature of the first sliding spherical surface, thereby applying a preload to the first ball portion and the first socket portion.

(34) The preload application method according to (33), wherein a degree to which the second ball portion and the second socket portion are brought close to each other is adjusted by fixing the second ball portion to one end of a shaft penetrating through the first sliding spherical surface and the second sliding spherical surface and adjusting a coupling position of the other end of the shaft with respect to the pad.

What is claimed is:

1. A coupling mechanism for a tilting pad bearing, which couples a pad and a support in such a manner that the pad can be tilted with respect to the support, comprising:
a first ball portion and a first socket portion to which a preload is applied, wherein a first contact surface between the first ball portion and the first socket portion serves as a first sliding spherical surface,
the coupling mechanism further comprising a second ball portion and a second socket portion, wherein a second contact surface between the second ball portion and the second socket portion serves as a second sliding spherical surface,
wherein a center of first curvature of the first sliding spherical surface and a center of second curvature of the second sliding spherical surface are common,
wherein a radius of the first curvature is longer than a radius of the second curvature on a virtual radial line crossing the first ball portion and the second ball portion,
wherein the center of the first curvature and the center of the second curvature are located in an area opposite to a sliding surface of the pad, and
wherein a distance between the center of the first curvature and the sliding surface of the pad is longer than a distance between the center of the first curvature and the first sliding spherical surface and is longer than a distance between the center of the second curvature and the second sliding spherical surface.

2. The coupling mechanism according to claim 1, wherein a center of the second sliding spherical surface exists on a virtual line connecting a center of the first sliding spherical surface and the center of the first curvature.

3. The coupling mechanism according to claim 1, wherein the first ball portion is fixed to the support, and the first socket portion is fixed to the pad, and
the second ball portion is fixed to the pad, and the second socket portion is fixed to the support.

4. The coupling mechanism according to claim 1, further comprising a shaft that couples the pad and the support, wherein a preload applied by the shaft decreases a distance between the pad and the support.

5. The coupling mechanism according to claim 4, wherein the shaft penetrates the first sliding spherical surface and the second sliding spherical surface.

6. The coupling mechanism according to claim 1, further comprising a shaft that couples the pad and the support, wherein a preload applied by the shaft decreases a distance between the pad and the support, the second ball portion is fixed to one end side of the shaft, and the other end side of the shaft is fixed to the pad.

7. A coupling mechanism for a tilting pad bearing, which couples a pad and a support in such a manner that the pad can be tilted with respect to the support, comprising:
a first ball portion and a first socket portion to which a preload is applied,
the first ball portion and the first socket portion being in contact with each other on a first sliding spherical surface,
the coupling mechanism further comprising a second ball portion and a second socket portion that are in contact with each other on a second sliding spherical surface, wherein
a center of first curvature of the first sliding spherical surface and a center of second curvature of the second sliding spherical surface are common, and
the second ball portion and the first socket portion are rigidly coupled to each other, the second socket portion and the first ball portion are rigidly coupled to each other, and by decreasing a distance between the second ball portion and the second socket portion, the first ball portion and the first socket portion are preloaded and a distance between the first ball portion and the first socket is decreased.

8. The coupling mechanism according to claim 7, wherein upper edges, on a side of the center of the first curvature, of the first ball portion and the second ball portion are open.

9. A tilting pad bearing comprising a coupling mechanism for the tilting pad bearing, which couples a pad and a support in such a manner that the pad can be tilted with respect to the support and a pad, wherein the coupling mechanism includes
a first ball portion and a first socket portion to which a preload is applied, wherein a first contact surface between the first ball portion and the first socket portion serves as a first sliding spherical surface, and
a second ball portion and a second socket portion, wherein a second contact surface between the second ball portion and the second socket portion serves as a second sliding spherical surface,
wherein a center of first curvature of the first sliding spherical surface and a center of second curvature of the second sliding spherical surface are common,
wherein a radius of the first curvature is longer than a radius of the second curvature on a virtual radial line crossing the first ball portion and the second ball portion,
wherein the center of the first curvature and the center of the second curvature are located in an area opposite to a sliding surface of the pad, and
wherein a distance between the center of the first curvature and the sliding surface of the pad is longer than a distance between the center of the first curvature and the first sliding spherical surface and is longer than a distance between the center of the second curvature and the second sliding spherical surface.

10. The tilting pad bearing according to claim 9, wherein a sliding surface of the pad has a concave shape, a convex shape, or a flat plate shape along a tilting direction of the pad.

11. The tilting pad bearing according to claim 10, wherein the sliding surface of the pad has a concave shape along the tilting direction of the pad, and, when the pad is viewed from a plane, a lowermost end of the sliding surface of the pad and the center of the first curvature are common.

12. The tilting pad bearing according to claim 10, further comprising a support, wherein the support is arranged so as to sandwich the coupling mechanism with the pad.

13. The tilting pad bearing according to claim 9, wherein the sliding surface of the pad is formed with a textured surface, and/or is formed of one or more selected from a PEEK composite, a PTFE composite, a white metal, an aluminum alloy, and a copper alloy.

14. The tilting pad bearing according to claim 9, wherein, when the pad is viewed from a sliding surface side, a center of a projection surface thereof and the center of the first curvature are displaced.

15. The tilting pad bearing according to claim 9, wherein a center of the second sliding spherical surface exists on a virtual line connecting a center of the first sliding spherical surface and the center of the first curvature.

16. The tilting pad bearing according to claim 9, wherein
the first ball portion is fixed to the support, and the first socket portion is fixed to the pad, and
the second ball portion is fixed to the pad, and the second socket portion is fixed to the support.

17. The tilting pad bearing according to claim 9, wherein the coupling mechanism further includes a shaft that couples the pad and the support, and
wherein a preload applied by the shaft decreases a distance between the pad and the support.

18. The tilting pad bearing according to claim 17, wherein the shaft penetrates the first sliding spherical surface and the second sliding spherical surface.

19. The tilting pad bearing according to claim 9, wherein the coupling mechanism further includes comprising a shaft that couples the pad and the support, and
wherein a preload applied by the shaft decreases a distance between the pad and the support, the second ball portion is fixed to one end side of the shaft, and the other end side of the shaft is fixed to the pad.

\* \* \* \* \*